Fig.1

Sept. 9, 1947.    S. L. G. KNOX    2,427,057
CONVEYER SYSTEM
Filed April 25, 1945    8 Sheets-Sheet 2

Sept. 9, 1947.   S. L. G. KNOX   2,427,057
CONVEYER SYSTEM
Filed April 25, 1945   8 Sheets-Sheet 4

Fig. 4

Inventor
S. L. Griswold Knox
by Roberts, Cushman & Grover
att'ys.

Sept. 9, 1947.  S. L. G. KNOX  2,427,057
CONVEYER SYSTEM
Filed April 25, 1945  8 Sheets-Sheet 6

Inventor
S. L. Griswold Knox
by Roberts, Cushman & Grover
attys.

Sept. 9, 1947. S. L. G. KNOX 2,427,057
CONVEYER SYSTEM
Filed April 25, 1945 8 Sheets-Sheet 8

Inventor
S. L. Griswold Knox
by Roberts, Cushman & Grover
att'ys.

Patented Sept. 9, 1947

2,427,057

UNITED STATES PATENT OFFICE 2,427,057

CONVEYOR SYSTEM

Samuel L. Griswold Knox, New York, N. Y., assignor to Lamson Corporation, Syracuse, N. Y., a corporation of New York Application April 25, 1945, Serial No. 590,220

19 Claims. (Cl. 198—38)

This invention relates to a conveyor system of the type having a conveyor member traveling along a fixed path between a plurality of stations, each having dispatch and/or receiving mechanism automatically operative in response to a selective control mechanism to dispatch and receive loads to and from the carriers of the conveyor, and as illustrative of its utility the invention is herein shown as embodied in a conveyor of the type illustrated in U. S. patent to Knox No. 2,310,462, granted February 9, 1943.

The principal object of the invention is to provide an efficient and reliable selective control mechanism for governing the operation of the dispatch and receiving mechanisms at the various stations.

Further objects relate to various features of the selective control mechanism and will be apparent from consideration of the following description and the accompanying drawings wherein.

In accordance with the present invention a conveyor member such as an endless chain or the like, capable of supporting spaced carriers, travels along a fixed path between a plurality of stations, each equipped with a dispatch mechanism and/or a receiving mechanism, including means operative to transfer loads to and from the carriers, and a selective control mechanism governing the operation of the dispatch and receiving mechanisms.

The selective control mechanism comprises a plurality of trips or the like mounted on each carrier so as to be selectively moved, individually or in combination, in accordance with a selected destination of the load carried thereby, from an inoperative position to an operative position by means of trip setting levers corresponding to the trips and arranged so as to swing from an inactive to an active position wherein they engage and move the trips of a passing carrier to operative position. The trip setting levers are selectively operated by a manual control which may comprise a rotatable member or other suitable means having portions adapted to engage the levers so as to swing one or more to active position in accordance with the selected destination of the load.

Each dispatch station is provided with electrically actuated means for effecting the operation of the dispatch mechanism, and to this end a solenoid, motor or the like, may be connected in an electrical circuit having one or more switches so designed and arranged as to be conjointly responsive to a load received by the dispatch mechanism and the approach of an empty carrier to effect the operation of the dispatch mechanism.

Each receiving station is likewise provided with electrically actuated means for effecting the operation of the receiving mechanism, and accordingly such means may comprise a solenoid or motor connected in an electrical circuit having switches located in advance of the receiving station and arranged to be actuated by the trips of an approaching carrier when set to correspond to the station, thereby to effect the operation of the receiving mechanism. In addition, each receiving station is provided with fixed lugs or the like means operative in response to the transfer of a load from the carrier to the receiving mechanism to return or restore the set trips corresponding to that station back to inoperative position.

Figure 1:
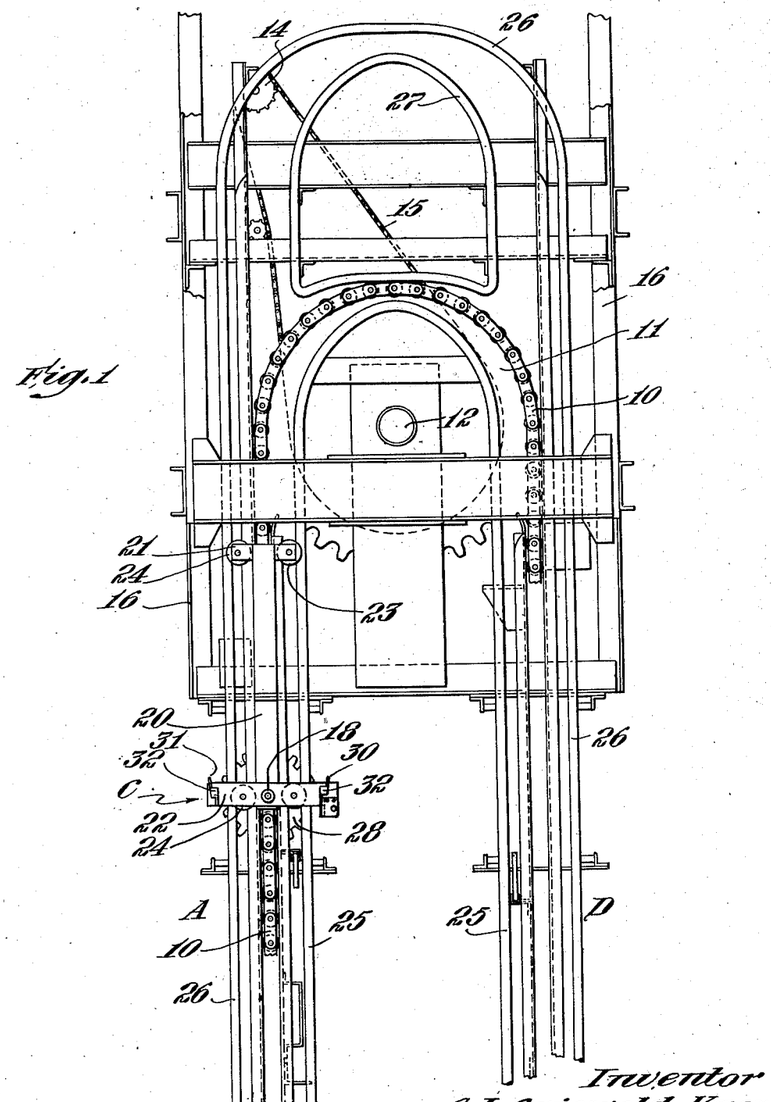
Fig. 1 is an elevation of the upper part of a vertical conveyor, showing the supporting framework, conveyor chain, load carriers, guides, and associated parts.

The embodiment herein shown is of the type employing an endless chain 10 having vertically arranged ascending and descending runs A and D, respectively. The upper run of a conveyor chain 10 travels over a driving sprocket 11 (Fig. 1) fixed to a shaft 12 which is driven by a sprocket 14 and a driving chain 15, the sprocket 14 being driven by a motor (not shown) connected thereto through suitable reduction gearing. The conveyor is supported by and operates within a frame structure 16 which extends vertically through openings in the several floors of a building to provide service therebetween, as more fully illustrated in my prior Patent No. 2,310,462, to which reference may be had for a more detailed description of the structure. Each floor may be provided with a dispatch or loading station adjacent to the ascending run A of the chain 10 and a receiving or unloading station adjacent to the descending run D. The chain 10 has pivotally connected to it, as indicated at 18, a plurality of properly spaced load carriers C, each comprising a vertical back member 20 (Figs. 1, 4, 6 and 7) having at its upper and lower ends laterally projecting arms 21 and 22 which carry guide rolls 23 and 24. These guide rolls run on endless rails 25, 26 and 27 (Fig. 1) suitably secured to the frame 16 and so arranged that as each carrier travels in a semicircular path, at the upper and lower runs, its back 20 is at all times guided and supported in the same vertical position as when travelling along the vertical run between the ends of the conveyor, it being understood that the lower part of the conveyor mechanism is substantially the same as the upper part, as illustrated in Fig. 1, except that the guide rails 25—27 are in an inverted position. In order to assist the travel of the carriers around the curves at the upper and lower ends of the conveyor, the lower end of each carrier is provided with a fixed gear or guide rack 28 adapted to mesh with a plurality of small gears (not shown) rotatably mounted in circumferentially spaced relation on the rear face of the sprockets 11 supporting the chain.

The outer ends of the lower arm 22 of each carrier C are secured to forwardly projecting horizontally disposed load-supporting arms 30 and 31 having inwardly offset portions providing shoulders upon which a box B (Fig. 4) or the like container, hereinafter referred to as the load, may be squarely seated, lugs 32 or the like retaining means being provided on the ends of the arms 30, 31 to prevent accidental displacement of the load. With this construction and arrangement the carrier C, whether loaded or empty, is propelled by the chain 10 and travels up the ascending run A, around the upper curved track, down the descending run D, and about the lower curved track with its back 20 at all times maintained in vertical position and its load-carrying arms 30, 31 in horizontal position.

Figure 4:
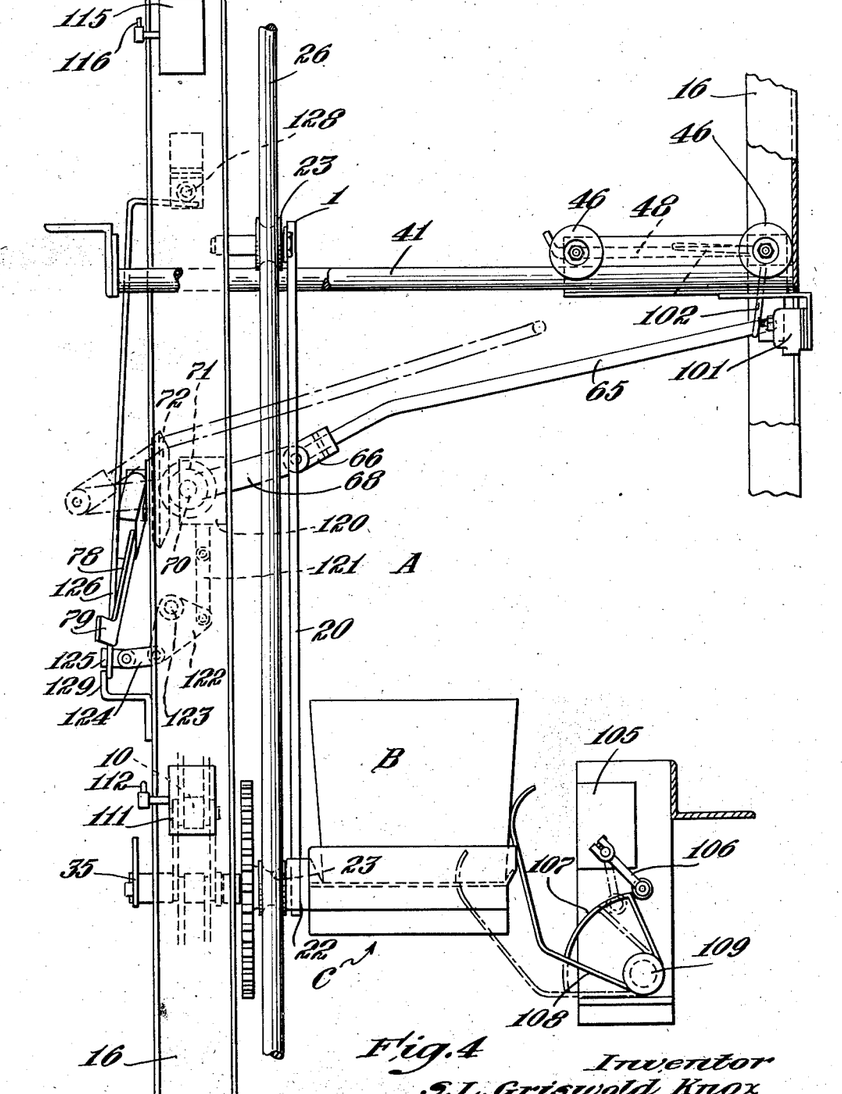
Figure 7:
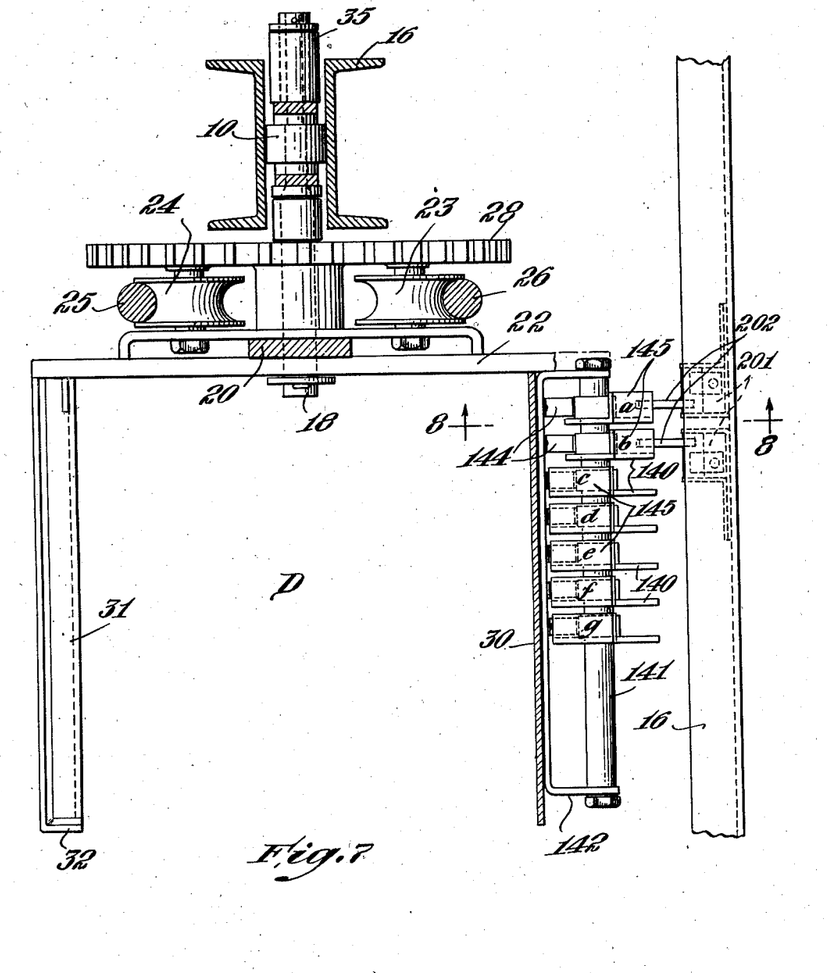
Fig. 7 is a plan view showing a carrier with set trips approaching a receiving or unloading station.

The pivotal connection 18 between the chain 10 and each carrier C is provided with an extension, as shown in Figs. 4 and 7, which carries a roller and an upstanding finger, the two parts constituting an operating lug 35, the utility of which is hereinafter pointed out.

Figures 2, 13:
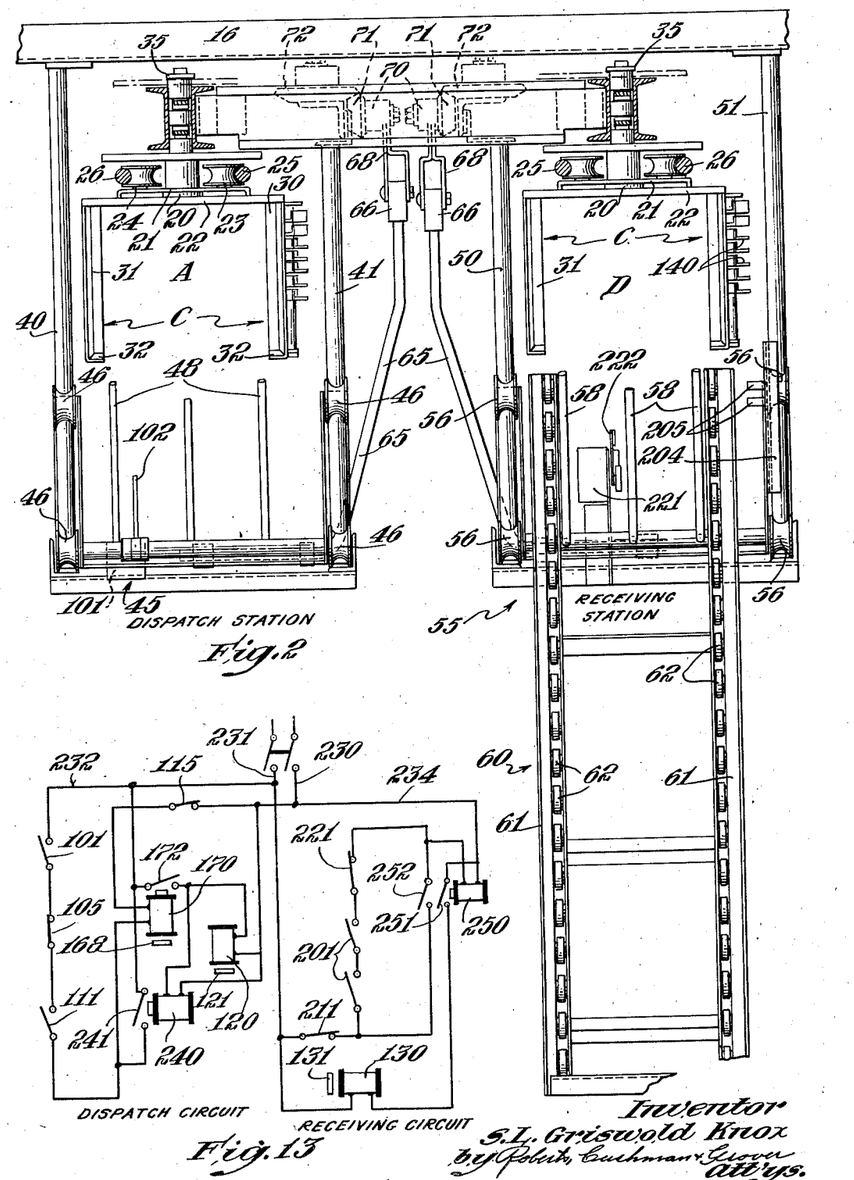
Fig. 2 is a plan view showing the dispatch and receiving mechanisms and associated actuating means.
Fig. 13 is a wiring diagram showing the connections between the actuating solenoids and associated parts.

Each dispatch station is provided with a pair of spaced rails 40, 41 (Figs. 2 and 4) which project horizontally on each side of the path of travel of the carriers on the ascending run A, and a dispatch carriage 45 (Figs. 2 and 4), equipped with grooved rollers 46, travels back and forth on the rails 40, 41 from a retracted position, as shown in the full lines of Figs. 2 and 4, to a forward or load transfer position in the path of travel of the ascending carriers. Each dispatch carriage 45 is provided with three horizontally projecting fingers 48 which constitute a transfer rack arranged to project into the path of travel of an ascending carrier between arms 30 and 31 so that a load on the carriage is bodily lifted from and thus transferred to a carrier C as it passes the station, when the carriage 45 is moved from retracted to load transfer position.

Each receiving station is also provided with a pair of rails 50, 51 (Fig. 2) which project horizontally on each side of the path of travel of the carriers on the descending run and a receiving carriage 55, equipped with rollers 56, travels back and forth on the rails 50, 51 from a retracted position, as shown in Fig. 2, to a forward or load-transfer position. The carriage 56 is provided with horizontally projecting fingers 58 constituting a transfer rack arranged to project into the path of travel of the descending carriers so that a load on a passing carrier is intercepted and thus transferred to the carriage when the latter is moved to load transfer position. If desired, a roller conveyor 60, comprising an inclined frame 61 having rolls 62 mounted thereon, may be arranged, as shown in Fig. 2, so as to receive loads picked up by the carriage 55 and convey them away from the station.

The actuating mechanism for both the dispatch and receiving stations (Figs. 2-4) are substantially the same and accordingly the same reference characters are applied to the same operating elements. The mechanism comprises a link 65 having its outer end pivotally connected to the frame of the adjacent carriage, as shown in Fig. 2, and its inner end pivotally connected through a coupling 66 to the outer end of a rocker arm 68. The inner end of the arm 68 is rigidly secured to the hub 70 of a bevel gear 71 meshing with a larger bevel gear 72 rotatably mounted on the framework 16, the construction and arrangement of parts being such that when gear 72 is rotated through an angle of the order of 90°, the gear 71 rotates and swings the arm 68 through an angle of the order of 180°, thereby drawing the link 65 inwardly, as indicated by the dot and dash lines of Fig. 4, thus pulling the associated carriage from retracted position to load-transfer position. Reverse rotation of the gear 72 is effective to retract the carriage from load-transfer position to normal or retracted position.

Figure 3:
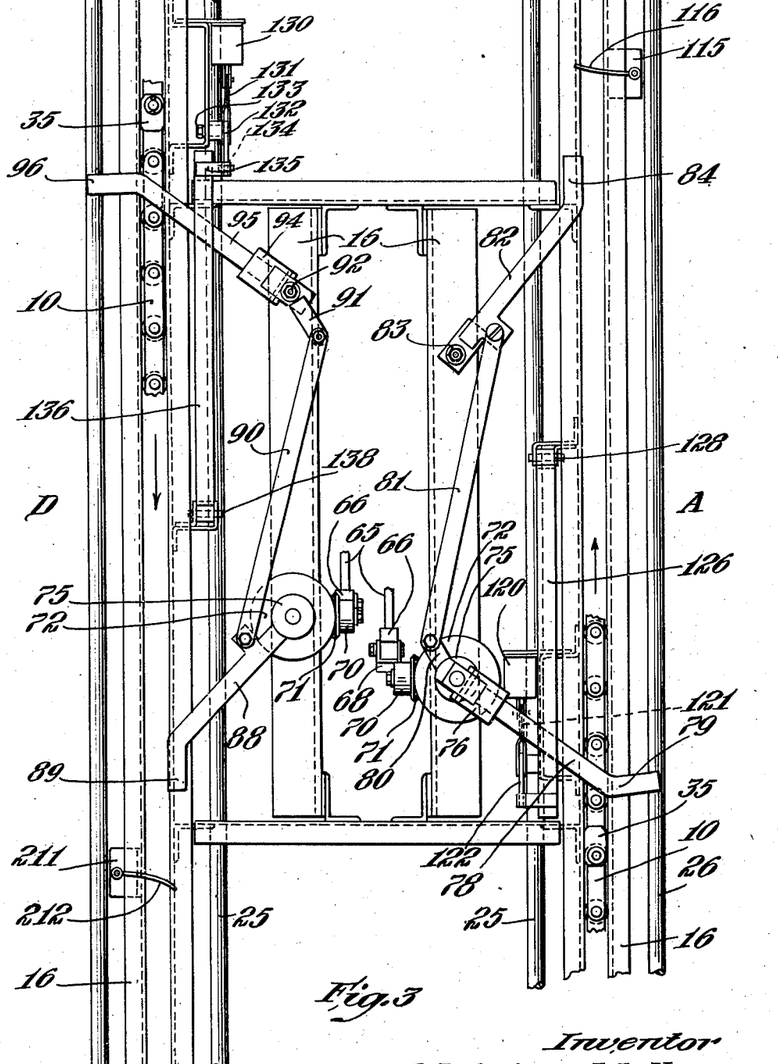
Figs. 3 and 4 are rear and side elevations showing the actuating means for the dispatch and receiving mechanisms.

The mechanism operating each of the gears 72 is in principle the same, although the arrangement of parts differs so that the gear 72 associated with the dispatch carriage is operated by the lug 35 when traveling along the ascending run, and the gear 72 associated with the receiving carriage is operated by the same lug when traveling down the descending run. Referring to Fig. 3, the hub 75 of the gear 72 associated with the dispatch station is pivotally connected to a bifurcated coupling 76 positioned on the end of an arm 78 which normally projects downwardly with its bent free end 79 disposed adjacent to the ascending run of the chain 10. The bifurcated coupling 76 includes a spring or the like resilient element (not shown) operative yieldingly to urge the arm 78 outwardly away from the chain run so that its end 79 is normally spaced outwardly from the line of travel of the operating lug 35. The opposite side of hub 75 is rigidly connected to a small arm 80, the outer end of which is pivotally secured to the lower end of a link 81, and the upper end of link 81 is pivotally connected to an arm 82 which is pivotally mounted at 83 on the framework 16. The arm 82 normally projects upwardly with its bent end 84 positioned inwardly relative to the chain run and line of travel of the lugs 35. With this construction and arrangement the lower arm 78 may be swung inwardly toward the chain run to operating position wherein it is engaged and lifted by an operating lug 35 carried by the chain 10, and when so operated the chain 10 swings arm 78 upwardly thereby rotating gear 72 counterclockwise (Fig. 3) through an angle of approximately 90° before the angular position of the arm 78 is such as to disengage the lug 35; and simultaneously the arm 82 is swung downwardly to bring its end 84 into a position to be engaged by the same operating lug 35 that operates the arm 78. As the chain 10 travels upwardly the lug 35 engages the end 84 and swings the arm 82 upwardly, thereby rotating gear 72 clockwise back to its original position by the time the operating lug 35 has become disengaged from the end 84 of arm 82. In the meantime the gear 72 operates the links 65 to move the associated carriage from retracted position to load-transfer position and back to retracted position, as above explained, thereby transferring its load to the passing carrier.

The mechanism for the receiving or unloading station is similar, but the hub 75 of gear 72 is rigidly connected with an arm 88 which normally projects downwardly with its bent end 89 positioned closely adjacent to but spaced inwardly of the descending run of chain 10 and operating lugs 35 carried thereby, as shown in Fig. 3. The intermediate portion of arm 88 is pivotally connected to the lower end of a link 90, the upper end of which is pivotally connected to one end of a small rocker arm 91 pivoted at 92 to the framework 16. The opposite end of rocker arm 91 is pivotally connected to a bifurcated coupling 94 secured to a lower end of an operating arm 95 which normally projects upwardly with its bent free end 96 adjacent to but spaced outwardly of the chain run and line of travel of the operating lugs 35. The bifurcated coupling 94 is the same as the coupling 76 and yieldingly urges arm 95 outwardly of the chain run. The arm 95, like arm 78, may be swung toward the descending run of chain 10 to operating position so as to be engaged by a lug 35 and when thus positioned an operating lug 35 traveling along the descending run swings the arm 95 downwardly to effect an approximate 90° rotation of gear 72 in a clockwise direction (Fig. 3) and consequent operation of the receiving mechanism; and simultaneously the arm 88 is swung upwardly so as to be engaged by the same operating lug 35 shortly after it disengages from the end 96 of arm 95, thereby effecting rotation of the gear 72 in a counterclockwise direction to return the receiving mechanism to retracted position, as above explained. The back and forth movement of the receiving carriage 55 takes place as a carrier is passing by the station and is thus effective to transfer a load from the carrier C to the receiving carriage 55 which in turn transfers it to the conveyor 60.

The selective control, as herein shown, is designed to operate the dispatch mechanism automatically in response to a load received by the dispatch carriage, the approach of an empty carrier and the setting of the control mechanism for a selected destination of the load, and also to operate the receiving mechanism automatically in response to the approach of a carrier with a load for the selected receiving station. Accordingly, the dispatch carriage 45 at each dispatch station (Figs. 2 and 4) is provided with a normally open switch 101 having an L-shaped actuating lever 102 mounted with its free end projecting upwardly above the level of fingers 48 so as to be depressed to close switch 101 when a load B is placed on a carriage, the switch being connected in a control circuit hereinafter described.

Below each dispatch station there is mounted a feeler device comprising a normally closed switch 105 (Fig. 4) having an actuating arm 106 engageable with a cam-like portion 107 of a feeler arm 108 pivotally mounted at 109 to the frame 16 so that its free end projects into the path of travel and between the supporting arms 30, 31 of the ascending carriers. If a passing carrier is empty the arm 108 remains inactive, as illustrated by the dot and dash lines of Fig. 4, but when the carrier is bearing a load B, then the feeler arm is engaged thereby and swings upwardly, as illustrated by the full lines of Fig. 4, so as to open switch 105 which is likewise connected in the control circuit.

A normally open station-operating switch 111 (Fig. 4) is mounted on the rear of the framework 16 at about the level of switch 105 and is provided with an actuating finger 112 which projects into the path of travel of lug 35 so as to be operated thereby momentarily to close switch 111 as a carrier C approaches the dispatch station and during the period when switch 105 would be or is being operated by the feeler arm 108. The switch 111 is also connected in the control circuit in series with switches 101 and 105 (Fig. 13) so that the circuit through these switches can be closed only by a load on the dispatch carriage 45 and the approach of an empty carrier, it being noted that a loaded carrier approaching the station holds switch 105 open during the period when switch 111 is closed.

At the rear of the frame 16 above the level of the dispatch station there is located a station-restoring switch 115 (Figs. 3 and 4) which is normally closed and is provided with an operating arm or finger 116 projecting into the path of travel of lug 35 so as to be operated thereby momentarily to open switch 115 after the carrier C has departed from the dispatch station, thereby opening the control circuit to restore the station and associated mechanisms to normal position, as hereinafter explained.

The actuating means (parts 65—96) for the dispatch mechanism (parts 40—46) is electrically operated in response to the closing of the switches 101, 111 and the approach of an empty carrier C which permits switch 105 to remain closed, and to this end a solenoid 120 (Figs. 3 and 4), mounted on the framework 16, has its armature connected to one end of a link 121, the opposite end of which is connected to a rocker arm or plate 122 pivotally mounted at 123 (Fig. 4) to the framework 16. The rocker plate 122 is connected through a link 124 (Fig. 4) to a finger 125 engageable with the lower end of a shipper bar or rod 126, the upper end of which is pivotally mounted at 128 to the framework 16. The lower end of the shipper bar 126 extends across and in contact with the lower end portion of the arm 78, its outward movement being limited by a stop 129 (Fig. 4) carried by the framework 16. The construction and arrangement of parts are such that when solenoid 120 is energized, it operates through link 121, rocker plate 122, link 124, and finger 125 to pull the actuating arm 78 inwardly to operating position.

Substantially the same mechanism is employed to operate arm 95 of the actuating mechanism for the receiving station, and as shown in Fig. 3, a solenoid 130 is mounted on the framework 16 above the level of the receiving station and operates through a link 131, a rocker plate 132 pivoted at 133, a second link 134 and finger 135 to pull a shipper bar 136 inwardly. The lower end of the shipper bar 136 is pivoted to the framework at 138 and extends upwardly across and in contact with the upper end portion of actuating arm 95. Hence, when solenoid 130 is energized it operates to pull arm 95 inwardly to operating position.

Figure 5:
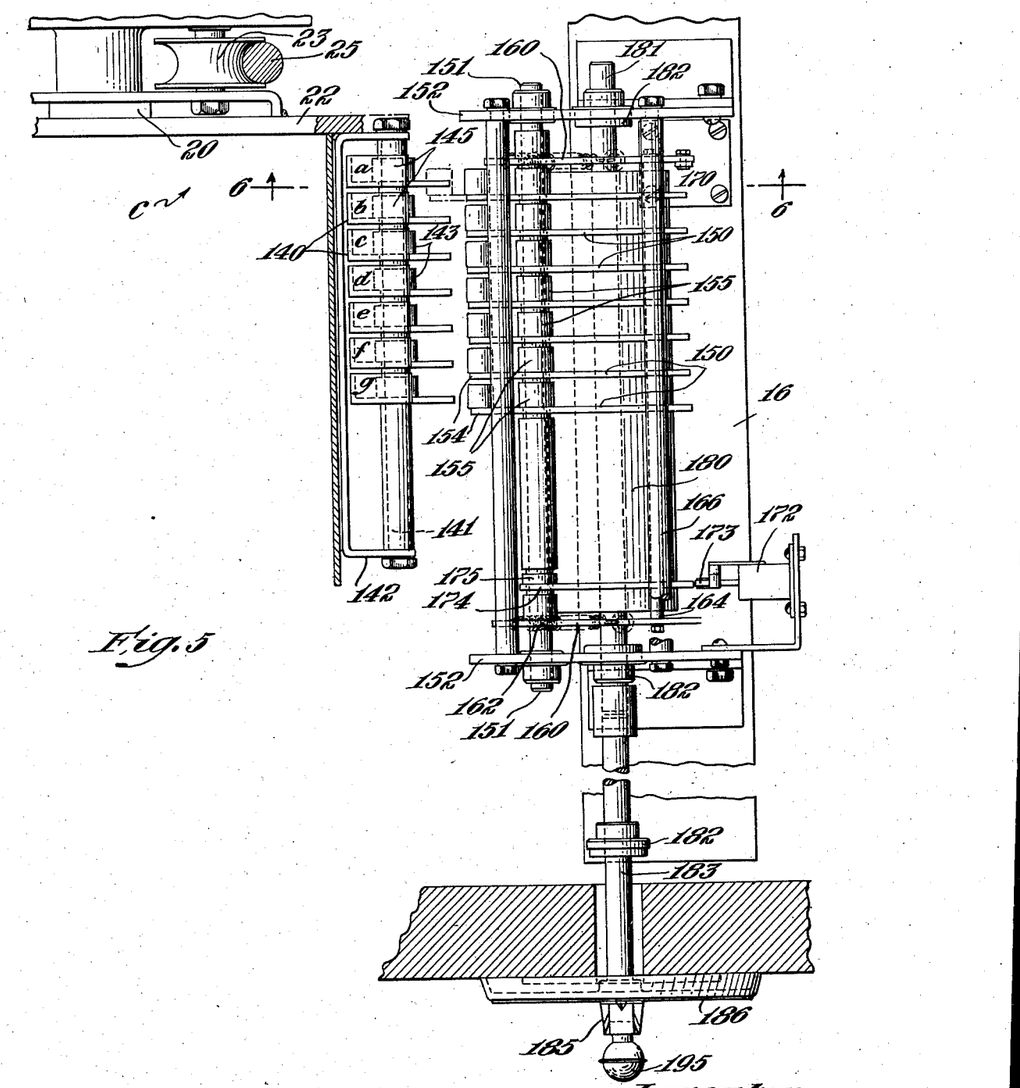
Fig. 5 is a plan view of the selective mechanism, showing its association with a carrier approaching a dispatch or loading station.
Figure 6:
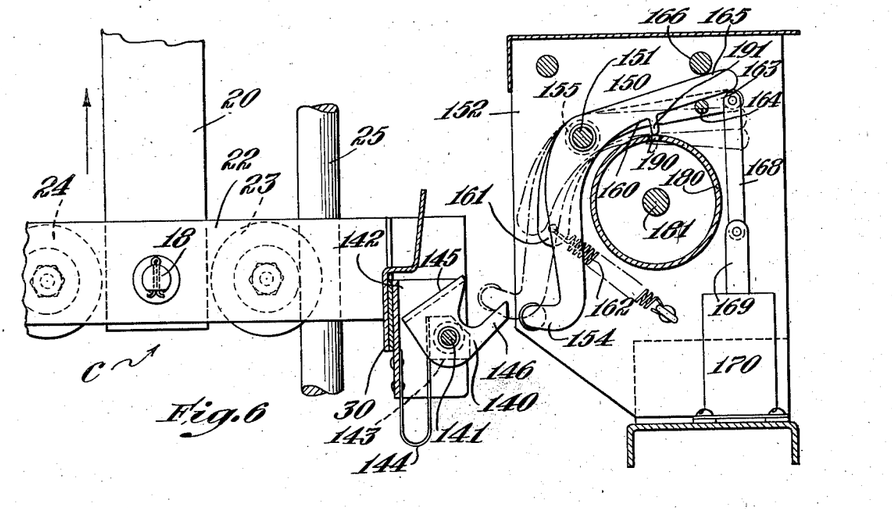
Fig. 6 is an enlarged section on the line 6—6 of Fig. 5.

Referring to Figs. 5-12, the delivery of the load picked up at a dispatch station is governed by a mechanism which comprises a bank of trips 140 (Figs. 5-8) mounted on a common shaft 141 carried by a bracket 142 which is rigidly secured to the outer face of arm 30 of each carrier C. A plurality of U-shaped springs 144, one for each trip, carried by the bracket 142 with free ends engaging square hubs 143 (Fig. 6) on the trips 140, yieldingly oppose rotation of the trips and normally hold them in an inoperative or unset position (Fig. 6). The trips are so shaped that when in inoperative position their relatively wide flat heads or active portions 145 (Figs. 5-7) are within the confines of the bracket 142, although their hooked outer ends 146 project outwardly beyond the confines of the bracket 142, but when swung downwardly to operative position (Fig. 8), their active portions or heads 145 project outwardly beyond the confines or side line of bracket 142, as illustrated in Fig. 7 wherein the two set trips $a$ and $b$ at the inner end of shaft 141 are in set or operative position and the other trips $c$ to $g$ are in inoperative position.

The trips 140 are set by a plurality of trip-setting levers (Figs. 5 and 6) corresponding in number and location to the trips 140 and these levers are pivotally mounted on a rock shaft 151 which is rotatably mounted in brackets 152 secured to the framework 16. The levers 150 are L-shaped with their depending ends 154 positioned so as to be swung outwardly from inactive position to trip-setting position wherein they are engageable with the hooked ends 146 of trips 140, as illustrated by the dot and dash lines of Fig. 6, when a carrier C is passing the dispatch station. Each trip is provided with a hub 155 which has a frictional grip about rock shaft 151 such as produced by a conventional spring pressed ball and socket arrangement or the like (not shown) which is normally effective to swing the lower ends 154 of the levers outwardly when shaft 151 is rocked in a clockwise (Fig. 6) direction, but which permits slippage between the shaft and each lever when the latter is restrained or held against rotation.

An L-shaped rocker arm 160 (Figs. 5 and 6) is pinned or otherwise fixed to each end of shaft 151 and the depending end 161 of each arm is secured to one end of a tension spring 162, the other end of which is secured to the bracket 152, the springs 162 yieldingly urging the shaft 151 counterclockwise (Fig. 6) so as to hold the trip-setting levers 150 in inactive or retracted position. The upper end 163 of each rocker arm supports one end of a rod 164 which extends horizontally beneath and in contact with the tails 165 of the trips 150, as shown in Fig. 6. The springs 162 not only act through shaft 151 and hubs 155 to hold the trip-setting levers in inactive position, but also through rod 164 to lift the tails 165 upwardly against a stop rod 166 which extends between the ends of bracket 152 and above the tails 165 to provide a stop, as shown in Figs. 5 and 6.

The upper end 163 of one of the rocker arms is pivotally secured to one end of a link 168 (Figs. 5 and 6), the other end of which is pivotally secured to the plunger or armature 169 (Fig. 6) of a solenoid 170 mounted on the framework. Hence, when solenoid 170 is energized it acts to swing the arm 163 downwardly against the action of springs 162 to rotate shaft 151 in a clockwise direction and thus swing the lower ends 154 of the trip-setting levers outwardly from inactive position, shown by the full lines of Fig. 6, to an active position, as shown by the dot and dash lines, unless restrained in the manner hereinafter described. Conversely, when the solenoid is deenergized the springs 162 act to restore the trip-setting levers as above explained.

The operation of solenoid 170 is also effective to close a normally open relay switch 172 (Fig. 5), and to this end the operating lever 173 of switch 172 is connected through a link 174 and an arm 175 to rocker shaft 151, the construction and arrangement of parts being such that when the shaft 151 rocks in a clockwise direction (Fig. 6) it acts to close switch 172 which, as hereinafter pointed out, controls a relay or holding circuit which maintains a closed circuit through the solenoids 120 and 170 until after the carrier C has passed the dispatch station.

Figure 9:
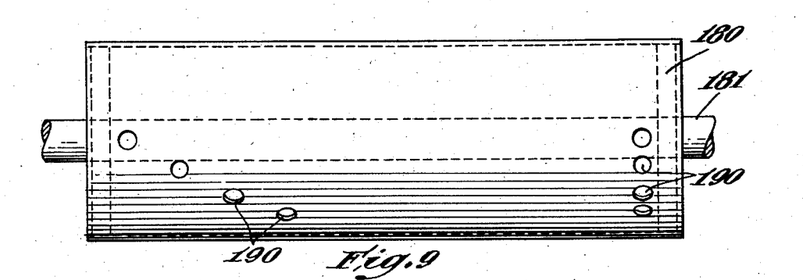
Fig. 9 is a plan view of the trip-setting drum.
Figure 10:
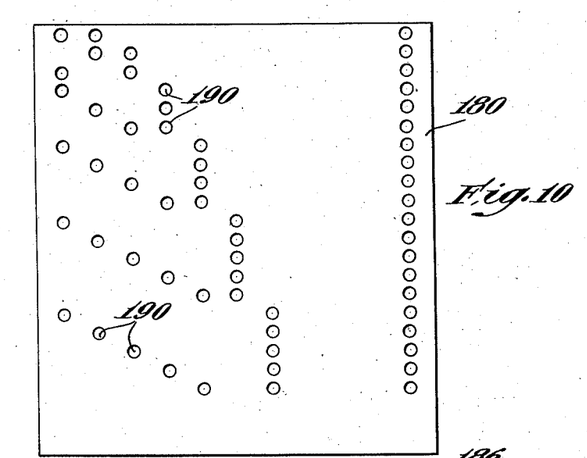
Fig. 10 is a developed view of the trip-setting drum.
Figure 11:
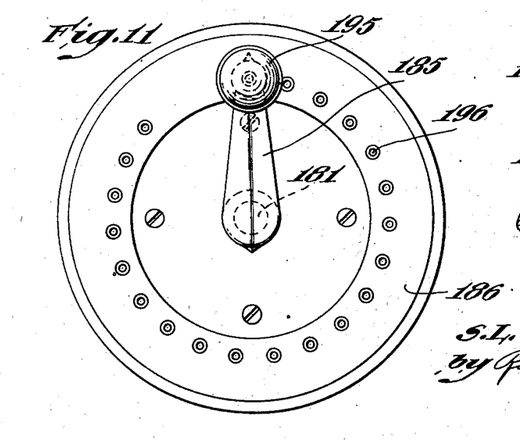
Fig. 11 is a front view of the setting lever for the drum.
Figure 12:
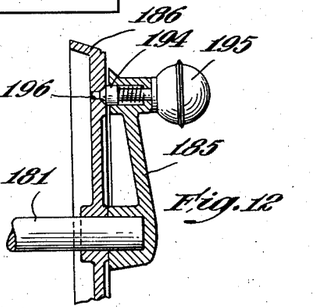
Fig. 12 is a vertical section through the upper part of the setting lever.

Although the movements of the trip-setting levers may be selectively controlled by any means capable of effecting the operation of one or more levers, the particular means herein shown by way of example comprises a cylinder or drum 180 (Figs. 5, 6 and 9) secured to a shaft 181 which is rotatably mounted in suitable bearings 182 secured to the framework. The shaft 181 is provided with an extension 183 (Fig. 5), the outer end of which carries a crank handle 185 cooperating with a dial or index 186 (Figs. 5, 11 and 12) and by means of which the drum may be rotated in one direction or the other. The face of the drum, as shown in Figs. 9 and 10, is formed with a plurality of openings or recesses 190 which are shaped and arranged to receive depending lugs 191 (Fig. 6) secured to or integral with the under face of the tails 163 of the trip-setting levers. When solenoid 170 is energized the levers 150 are urged to swing clockwise but are restrained by lugs 191 which engage the imperforate surface of the drum 180, unless the drum has been set so as to bring one or more of the openings 190 into registry with one or more of the lugs 191, in which event one or more of the levers 150 swing to active or trip-setting position.

By properly locating the openings 190 selective control of the operation of any lever or combination of levers 150 may be accomplished and by correlating the location of the openings 190 with indicia on dial 186, the handle 185 may be swung to a position wherein it selectively controls the operation of any lever or combination of levers. The handle 185 may be locked in any of a plurality of positions corresponding to the setting of any lever or combination of levers by means of a spring pressed pin 194 (Fig. 12) associated with a knob 195 provided on the free end of handle 185, the pin 194 being designed to project into circumferentially spaced openings 196 formed on the face of the dial 186.

With this construction and arrangement the handle 185 may be rotated in one direction or the other to bring one or more openings 190 into registry with selected lever lugs 191 and upon energization of solenoid 170 the arm 160 is swung clockwise (Fig. 6), thereby rotating shaft 151 which swings the lower ends 154 of the selected levers outwardly to active position, all other levers being held in inactive position by the lugs 191 which engage the imperforate surface of drum 180.

Figure 8:
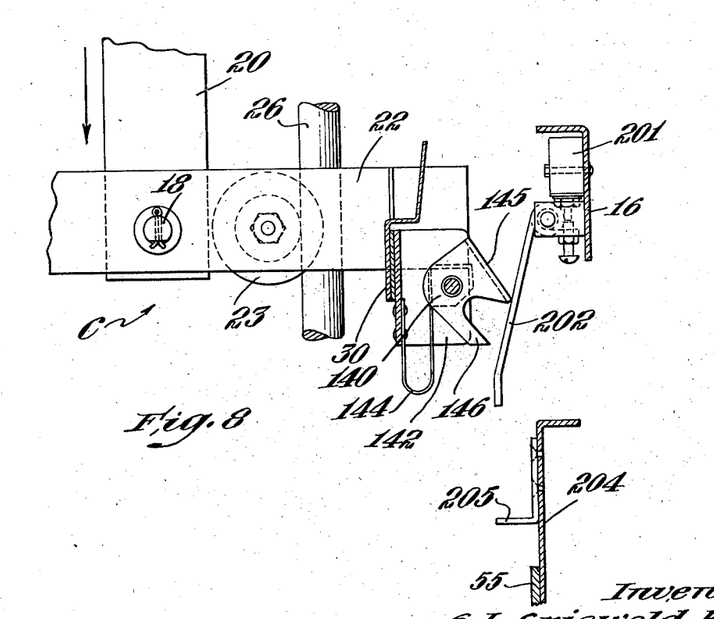
Fig. 8 is an enlarged section on the line 8—8 of Fig. 7.

As an ascending carrier C passes the station and picks up a load in a manner previously explained, the set levers 150 engage the hooked ends 146 of the trips on the carrier, as illustrated by the dot and dash lines of Fig. 6; thereby setting the trips corresponding to these levers to active position, as shown in Figs. 7 and 8. Simultaneously with the setting of the levers 150 by solenoid 170, the relay switch 172 is closed and as the carrier C with its load and set trips leaves the dispatch station it actuates switch 115 (Figs. 3 and 4) to break the control circuit and thus restore the station to normal. The carrier then continues its journey up the ascending run, around the top curve and down the descending run along which is located the unloading station which is to receive the load borne by the carrier.

It is apparent from the foregoing that the number of receiving stations may equal the number of trips plus the number of different combinations of such trips. For example, a carrier having but three trips a, b and c could be set for any one of seven destinations since there are three individual trip settings (a, b and c), plus four different combinations (ab, ac, bc and abc), and, as hereinafter pointed out, once the trips have been set they can only be reset to inactive position when the load has been delivered to the receiving carriage. In the embodiment herein shown it is assumed that the load is to be dispatched to a receiving station corresponding to and hence operated by the first two trips a and b (Figs. 5 and 7). Accordingly, the receiving station must be provided with two operating switches 201 arranged so as to be engaged and operated by the set trips a and b, and to this end the receiving station, in addition to the mechanism previously described, is provided with two normally open electric switches 201 (Fig. 7) mounted on framework 16 and located in advance of the station. Each switch 201 is provided with a depending arm 202 (Figs. 7 and 8), the end of which projects into the path of travel of the carrier C so as to be engaged by the active surface or portions 145 of the set trips a, b (corresponding to that station) and thus swung downwardly to close the switches 201 as a carrier approaches the receiving station. The switches 201 are connected in series in a circuit which controls the energization of solenoid 130 and a relay or holding circuit hereinafter more fully described, and upon closing the switches 201, solenoid 130 operates, as above explained, to actuate the receiving mechanism to transfer the load from the passing carrier to the receiving carriage 55. Each receiving carriage 55 has secured to the inner face of its frame just above the rail 51 a bracket 204 having one or more trip-setting lugs 205 (Figs. 2 and 8) projecting inwardly into the path of travel of the set trips, the lugs 205 being so arranged that when the carriage 55 is in load-transfer position, they are engageable with the active portions 145 of the set trips and as the carrier passes by it not only transfers its load, but also causes the trips to be re-set to normal or inactive position. As the departing carrier continues its downward movement it next operates a normally closed station-restoring switch 211 (Fig. 3) secured to the framework 16 and having an actuating arm 212 projecting into the line of travel of the operating lug 35.

With this construction and arrangement a loaded carrier C approaching the receiving station which is to receive its load first operates the switches 201, thereby effecting energization of solenoid 130 and the consequent operation of the receiving mechanism which brings carriage 55 to load-transfer position. The passing carrier then transfers its load to the carriage 55 and in passing the set trips engage the re-setting tabs 205 and are reset to inactive position. As the empty carrier C departs it next operates the station-restoring switch 211 and in the meantime the receiving mechanism retracts the loaded carriage 55 which transfers its load to the conveyor 60, as previously explained.

If for any reason the receiving carriage 55 does not operate, the loaded carrier C with its set trips continues on and necessarily makes another complete circuit. Such would be the case in event a previously loaded carriage 55 had not transferred its load to the conveyor (due to the conveyor being jammed or fully loaded) and in order to prevent the carriage 55 from operating there is provided a normally closed safety switch 221 (Fig. 2) which is secured to the frame 16 beneath the receiving carriage 55 and provided with an actuating arm 222 which extends upwardly beyond the level of the fingers 58 so as to be depressed by a load on the carriage when in retracted position. Depression of arm 222 opens switch 221 which remains open so long as a load remains on the retracted receiving carriage, but automatically closes when the load is lifted off or transferred to the conveyor 60. The switch 221 is connected in series with the trip-operated switches 201 so that the receiving station will not function unless and until a load has been removed from the receiving carriage 55.

Although any one of several electrical circuits may be employed for effecting the operation above described, the preferred circuit is illustrated schematically in Fig. 13 wherein the power supply lines 230, 231 are connected with control circuit 232 for each dispatch station and a control circuit 234 for each receiving station. Control circuit 232 comprises the normally open switch 101 (located on the dispatch carriage 45 and closed by a load thereon), the normally closed feeler switch 105 (located in advance of the dispatch station and closed only by an approaching carrier when loaded), and the normally open station-operating switch 111 (closed momentarily by an approaching carrier), are connected in series as shown. The three switches are connected to one terminal of the drum solenoid 170 and its other terminal is connected to the power line 230 through the normally closed station-restoring switch 115 (momentarily opened by a departing carrier). The solenoid 170 operates the normally open relay-control switch 172 which connects the line 231 with one terminal of actuating solenoid 120 and a relay solenoid 240, the other terminals of these solenoids being directly connected with power line 230. The relay solenoid 240 controls a normally open switch 241 which is in parallel with switches 101, 105 and 111 and thus provides a holding circuit which is established by the momentarily closing of the branch circuit through switches 101, 105 and 111. Accordingly, when these latter switches are closed in response to a load on the dispatch carriage 45 and the approach of an empty carrier C, solenoid 170 is energized and effects closing of switch 172 which in turn not only effects energization of solenoid 120, but also the relay solenoid 240 and consequent closing of holding switch 241. Although the closing of switch 111 is momentary, the holding circuit is now established and hence the solenoids 120, 170 and 240 remain energized after switches 101 and 111 open so as to operate the shipper bar 126 which in turn controls the operation of the dispatch mechanism. When the departing carrier C momentarily opens switch 115 the holding circuit is broken and all solenoids are deenergized, thereby restoring the station to normal.

In event a loaded carrier C were approaching a dispatch station having a load on its carriage 45, the feeler arm 108 of switch 105 would be engaged by the load and hence the switch 105 would be opened, thereby breaking and holding open the circuit 232 during the time when switch 111 is momentarily closed, and thus prevents energization of the solenoids. In like manner an empty dispatch carriage 45 would permit switch 101 to remain open and hence prevent operation of the dispatch mechanism in all cases where there was no load to be transferred to the approaching carrier.

Receiving circuit 234 comprises the normally open trip-controlled switches 201 (located on the approaching side of the receiving station and arranged in a predetermined position corresponding to the particular receiving station) the normally closed safety switch 221 (located beneath the receiving carriage 55 and opened by a load on the retracted carriage), and the normally closed station-restoring switch 211 (opened momentarily by a departing carrier), all connected in series. The circuit through these switches is connected to the power line 231 and to one terminal of a relay solenoid 250, the other terminal of which is directly connected to the power line 230. The relay solenoid 250 operates a pair of normally open switches 251 and 252, the switch 251 connecting power line 230 with one terminal of actuating solenoid 130, the other terminal of which is directly connected to power line 231, and the switch 252 being connected in parallel with switches 201 and 221 and constituting a holding circuit established by the closing of switches 201. Accordingly, when the switches 201 are momentarily closed by the set trips 140 of an approaching carrier with a load for the station and the switch 221 remains closed by reason of an empty receiving carriage, relay solenoid 250 is energized and closes switches 251 and 252, the former establishing a closed circuit through solenoid 130 and the latter establishing the holding circuit. As a carrier passes the station the switches 201 open but as the holding circuit has been established the solenoids 250 and 130 remain energized until the empty carrier in departing from the station operates switch 211 which breaks the holding circuit, thereby deenergizing the solenoids 130 and 250 and restoring the station to normal. In the meantime the load carriage 55 has been retracted and opens switch 221 during the interval required to transfer its load to conveyor 60.

In event a load previously received by the carriage 55 has not been removed, the safety switch 221 remains open and hence prevents energization of relay solenoid 250 and the consequent operation of the actuating mechanism. In such event, the loaded carrier would necessarily make another complete circuit and continue to do so until the load had been removed from the receiving carriage 55. It will be noted that in all cases where the load is not discharged from a carrier C the trips 140 on that carrier remain set and can only be reset when the load is actually transferred to a receiving carriage 55.

While I have shown and described one desirable embodiment of the invention it is to be understood that this disclosure is for the purpose of illustration and that various changes and modifications may be made without departing from the spirit and scope of the invention as set forth in the appended claims.

I claim:

1. In a conveyor system of the type having a conveyor member traveling along a fixed path between a plurality of stations, carriers secured to said member at spaced intervals and adapted to receive and carry a load from one station to another, dispatch mechanism at several of the stations for delivering a load to a carrier and receiving mechanism at several of the stations for receiving a load borne by a carrier, control mechanism for governing the operation of the dispatch and receiving mechanisms, comprising a plurality of trips mounted on each carrier so as to be individually moved from inoperative position to an operative position, a plurality of trip-setting levers corresponding to said trips and mounted at each dispatch station along the path of travel of the carriers to move from one position to another, lever-setting means at each dispatch station including a rotatable member having a cylindrical surface engageable with said levers to hold them in one position and spaced openings shaped to receive parts of said levers to permit them to move to another position, the parts being constructed and arranged to operate selected levers so as to move the corresponding trips on a passing carrier from inoperative to operative position, an electrical control circuit at each dispatch station conjointly responsive to a load received by the dispatch mechanism and the approach of an empty carrier for effecting operation of the dispatch mechanism, and an electrical control circuit at each receiving station responsive to a particular setting of the trips of an approaching carrier for operating the receiving mechanism.

2. In a vertical conveyor system of the type having an endless conveyor member arranged to define ascending and descending runs between several floors of a building, carriers secured to said member at spaced intervals and adapted to receive and carry a load from one station to another, dispatch mechanism at several of the stations adjacent to the ascending run for delivering a load to a carrier, and receiving mechanism at several of the stations adjacent to the descending run for receiving a load borne by the carrier, control mechanism for governing the operation of the dispatch and receiving mechanisms comprising a plurality of trips mounted on each carrier so as to be individually moved from an inoperative position to an operative position, a plurality of trip-setting levers corresponding to said trips and mounted at each dispatch station along the ascending run of the carriers to move from one position to another, lever-setting means at each dispatch station including a rotatable member having a cylindrical surface engageable with said levers to hold them in one position and spaced openings shaped to receive parts of said levers to permit them to move to another position, the parts being constructed and arranged to operate selected levers so as to move the corresponding trips on a carrier from inoperative to operative position, an electrical control circuit at each station conjointly responsive to a load received by the dispatch mechanism and the approach of an empty carrier for effecting operation of the dispatch mechanism, an electrical control circuit at each receiving station responsive to a particular setting of the trips of an approaching carrier for operating the receiving mechanism, and means at each receiving station responsive to the operation of said receiving mechanism for resetting the set trips corresponding to that station back to inoperative position.

3. In a conveyor system of the type having an endless conveyor member arranged to define ascending and descending runs between several floors of a building, carriers secured to said member at spaced intervals and adapted to receive and carry a load from one station to another, dispatch mechanism at several of the stations adjacent to the ascending run including transfer means horizontally movable into and out of load-transfer position with respect to carriers traveling along the ascending run, and receiving mechanism at several of the stations adjacent to the descending run, including transfer means horizontally movable into and out of load-transfer position with respect to carriers traveling along the descending run, control mechanism for governing the operation of the dispatch and receiving mechanisms, comprising a plurality of trips mounted on each carrier so as to be individually swung from an inoperative position to an operative position, a plurality of trip-setting levers corresponding to said trips and mounted at each dispatch station along the ascending run so as to swing outwardly from inactive position to active position so as to engage the trips of a passing carrier, lever-setting means at each dispatch station including a rotatable drum engageable with said levers to hold them in inactive position, said drum having spaced openings to receive parts of said levers and permit selected levers to move from inactive position to an active position wherein the selected levers set the corresponding trips on a passing carrier to operative position, means at each dispatch station conjointly responsive to a load received by the transfer means and the approach of an empty carrier for operating the transfer means of the dispatch mechanism into and out of load-transfer position in timed relation to the travel of the empty carrier by the station, means along the descending run and in advance of each receiving station responsive to a particular setting of the trips of an approaching carrier for operating the transfer means of the receiving mechanism into and out of load-transfer position in timed relation to the travel of a carrier by the station, and means at each receiving station responsive to the operation of said receiving mechanism for resetting the set trips corresponding to that station back to inoperative position.

4. In a conveyor system of the type having an endless conveyor member arranged to define ascending and descending runs between several floors of a building, carriers secured to said member at spaced intervals and adapted to receive and carry a load from one station to another, dispatch mechanism at several of the stations adjacent to the ascending run including transfer means horizontally movable into and out of load-transfer position with respect to carriers traveling along the ascending run, and receiving mechanism at several of the stations adjacent to the descending run, including transfer means horizontally movable into and out of load-transfer position with respect to carriers traveling along the descending run, control mechanism for governing the operation of the dispatch and receiving mechanisms, comprising a plurality of trips mounted on each carrier so as to be individually swung from an inoperative position to an operative position, a plurality of trip-setting levers corresponding to said trips and mounted at each dispatch station along the ascending run so as to swing outwardly from inactive position to active position so as to engage the trips of a passing carrier, lever-setting means at each dispatch station including a rotatable drum engageable with said levers to hold them in inactive position, said drum having spaced openings to receive parts of said levers and permit selected levers to move from inactive position to an active position wherein the selected levers set the corresponding trips on a passing carrier to operative position, means at each dispatch station conjointly responsive to a load received by the transfer means and the approach of an empty carrier for operating the transfer means of the dispatch mechanism into and out of load-transfer position in timed relation to the travel of the empty carrier by the station, means along the descending run and in advance of each receiving station responsive to a particular setting of the trips of an approaching carrier for operating the transfer means of the receiving mechanism into and out of load-transfer position in timed relation to the travel of a carrier by the station, and means carried by the transfer means of the receiving station for resetting the set trips of a carrier back to inoperative position.

5. In a conveyor system of the type having a conveyor member traveling along a fixed path between a plurality of stations, carriers secured to said member at spaced intervals and adapted to receive and carry a load from one station to another, dispatch mechanism at several of the stations for delivering a load to a carrier and receiving mechanism at several of the stations for receiving a load borne by a carrier, control mechanism at each dispatch station governing the operation of the dispatch mechanism, comprising a plurality of trips mounted on each carrier so as to be individually moved from inoperative position to an operative position, a plurality of trip-setting levers corresponding to said trips and mounted at each dispatch station along the path of travel of the carriers, lever-setting means at each dispatch station including a rotatable drum having spaced openings, the surface of said drum being engageable with said levers to hold them in an inactive position and said openings being arranged to receive parts of said levers to permit them to move to an active position to operate selected levers so as to move the corresponding trips on a passing carrier from inoperative to operative position, an electrical circuit including a solenoid operative when energized to actuate the dispatch mechanism, a normally open switch carried by the dispatch mechanism and so arranged as to be closed when a load is placed on the dispatch mechanism, a normally closed switch having an actuating member projecting into the path of travel of the carriers so as to engage a load carried thereby and open the switch, the two switches being connected in series with each other and in the circuit of said solenoid so as to control the operation of the dispatch mechanism, and means at each receiving station responsive to a particular setting of the trips of an approaching carrier for operating the receiving mechanism.

6. In a conveyor system of the type having a conveyor member traveling along a fixed path between a plurality of stations, carriers secured to said member at spaced intervals and adapted to receive and carry a load from one station to another, dispatch mechanism at several of the stations for delivering a load to a carrier and receiving mechanism at several of the stations for receiving a load borne by a carrier, control mechanism for governing the operation of the dispatch and receiving mechanisms, comprising a plurality of trips mounted on each carrier so as to be individually moved from inoperative position to an operative position, a plurality of trip-setting levers corresponding to said trips and mounted at each dispatch station along the path of travel of the carriers, lever-setting means at each dispatch station including a rotatable drum having spaced openings, the surface of said drum being engageable with said levers to hold them in an inactive position and said openings being arranged to receive parts of said levers to permit them to move to an active position to operate selected levers so as to move the corresponding trips on a passing carrier from inoperative to operative position, means at each dispatch station conjointly responsive to a load received by the dispatch mechanism and the approach of an empty carrier for operating the dispatch mechanism, control means at each receiving station comprising an electrical circuit including a solenoid operative when energized to actuate the receiving mechanism, at least one normally open switch located in advance of the receiving station, said switch being connected in said circuit and having actuating means positioned so as to be engaged by a predetermined setting of at least one of the trips of a carrier approaching the station thereby to close the switch and effect the operation of the receiving mechanism, and means at each receiving station for resetting the trips corresponding to that station back to inoperative position.

7. In a conveyor system of the type having a conveyor member traveling along a fixed path between a plurality of stations, carriers secured to said member at spaced intervals and adapted to receive and carry a load from one station to another, dispatch mechanism at several of the stations for delivering a load to a carrier and receiving mechanism at several of the stations for receiving a load borne by a carrier, control mechanism for governing the operation of the dispatch and receiving mechanisms, comprising a plurality of trips mounted on each carrier so as to be individually moved from inoperative position to an operative position, a plurality of trip-setting levers corresponding to said trips and mounted at each dispatch station along the path of travel of the carriers, lever-setting means at each dispatch station including a rotatable drum having spaced openings, the surface of said drum being engageable with said levers to hold them in an inactive position and said openings being arranged to receive parts of said levers to permit them to move to an active position to operate selected levers so as to move the corresponding trips on a passing carrier from inoperative to operative position, an electrical circuit including a solenoid and circuit holding relay operative when energized to actuate the dispatch mechanism, a normally open switch carried by the dispatch mechanism and arranged so as to be closed when a load is placed on the dispatch mechanism, a normally closed switch having an actuating member projecting into the path of travel of an approaching carrier so as to engage a load carried thereby and open the switch, a normally open switch located in advance of each dispatch station and arranged to be closed by a carrier approaching the station, the three switches being connected in series with each other and in the circuit of said solenoid so as to control the operation of the dispatch mechanism, a fourth switch connected with the circuit-holding relay and disposed on the departing side of said station, said fourth switch being normally closed and operated by a carrier leaving said station to cut out said relay, a second electrical circuit associated with each receiving station and including a solenoid and circuit-holding relay operative when energized to actuate the receiving mechanism, at least one normally open switch located in advance of the station, said switch being connected in said second circuit and having actuating means positioned so as to be engaged by a predetermined setting of at least one of the trips of a carrier approaching the station thereby to close the switch and effect operation of the receiving mechanism, and means at each receiving station for resetting the set trips corresponding to that station back to inoperative position.

8. In a conveyor system of the type having a conveyor member traveling along a fixed path between a plurality of stations, carriers secured to said member at spaced intervals and adapted to receive and carry a load from one station to another, dispatch mechanism at several of the stations for delivering a load to a carrier and receiving mechanism at several of the stations for receiving a load borne by a carrier, control mechanism for governing the operation of the dispatch and receiving mechanisms, comprising a plurality of trips mounted on each carrier so as to be individually moved from inoperative position to an operative position, a plurality of trip-setting levers corresponding to said trips and mounted at each dispatch station along the path of travel of the carriers, lever-setting means at each dispatch station including a rotatable drum having spaced openings, the surface of said drum being engageable with said levers to hold them in an inactive position and said openings being arranged to receive parts of said levers to permit them to move to an active position to operate selected levers so as to move the corresponding trips on a passing carrier from inoperative to operative position, means at each dispatch station conjointly responsive to a load received by the dispatch mechanism and the approach of an empty carrier for operating the dispatch mechanism, control means at each receiving station comprising an electrical circuit including a solenoid operative when energized to actuate the receiving mechanism, at least one normally open switch located in advance of the receiving station, said switch being connected in said circuit and having actuating means positioned so as to be engaged by a predetermined setting of at least one of the trips of a carrier approaching the station thereby to close the switch and effect the operation of the receiving mechanism, a normally closed switch at each receiving station arranged so as to be opened by a load transferred from a passing carrier, said switch being connected in said circuit so as to prevent the energization of said solenoid when a load transferred to said receiving mechanism has not been removed, and means at each receiving sta- 9. In a conveyor system of the type having an endless conveyor member arranged to define ascending and descending runs between several floors of a building, carriers secured to said member at spaced intervals and adapted to receive and carry a load from one station to another, dispatch mechanism at several of the stations adjacent to the ascending run including lifting means horizontally movable into and out of load transfer position with respect to carriers traveling along the ascending run, and receiving mechanism at several of the stations adjacent to the descending run, including lifting means horizontally movable into and out of load transfer position with respect to carriers traveling along the descending run, control mechanism for governing the operation of the dispatch and receiving mechanisms, comprising a plurality of trips mounted on each carrier so as to be individually swung from an inoperative position to an operative position, a plurality of trip-setting levers corresponding to said trips and mounted at each dispatch station along the ascending run so as to swing outwardly from inactive position to engage the trips of a passing carrier, lever-setting means at each dispatch station including a rotatable drum having spaced openings, the surface of said drum being engageable with said levers to hold them in inactive position and said openings being arranged to receive parts of said levers to permit selected levers to swing from inactive position to an active position wherein the selected levers set the corresponding trips on a passing carrier to operative position, means at each dispatch station conjointly responsive to a load received by the lifting means and the approach of an empty carrier for operating the lifting means of the dispatch mechanism into and out of load transfer position in timed relation to the travel of the empty carrier by the station, control means at each receiving station comprising an electrical circuit including a solenoid operative when energized to actuate the receiving mechanism, a normally opened switch located in advance of said receiving station, said switch being connected in said circuit and having actuating means positioned so as to be engaged by a predetermined setting of the trips of the carrier approaching the station thereby to close the switch and effect the operation of the receiving mechanism, a normally closed switch at each receiving station arranged to be opened by a load transferred from a passing carrier, said switch being connected in said circuit so as to prevent the energization of said solenoid when a load transferred to said receiving mechanism has not been removed, and means at each receiving station for resetting the trips corresponding to that station back to inoperative position.

10. In a conveyor system of the type having an endless conveyor member arranged to define ascending and descending runs between several floors of a building, carriers secured to said member at spaced intervals and adapted to receive and carry a load from one station to another, dispatch mechanism at several of the stations adjacent to the ascending run, including a dispatch carriage horizontally movable into and out of load transfer position with respect to carriers traveling along the ascending run, and receiving mechanism at several of the stations adjacent to the descending run, including a receiving carriage horizontally movable into and out of load transfer position with respect to carriers traveling along the descending run, control mechanism for governing the operation of the dispatch and receiving mechanisms, comprising a plurality of trips mounted on each carrier so as to be individually set from an inoperative position to an operative position, a plurality of trip-setting levers corresponding to said trips and mounted at each dispatch station along the ascending run so as to swing outwardly from inactive position to engage the trips of a passing carrier, lever-setting means at each dispatch station including a rotatable drum having spaced openings, the surface of said drum being engageable with said levers to hold them in inactive position and said openings being arranged to receive parts of said levers to permit selected levers to swing from inactive position to active position wherein the selected levers set the corresponding trips on a passing carrier to operative position, a solenoid operative when energized to effect movement of the dispatch carriage to load transfer position, a normally open switch carried by the dispatch mechanism and arranged to be closed when a load is placed on the dispatch carriage, a normally closed switch having an actuating member projecting in the path of travel of the carriers approaching the dispatch station so as to engage a load carried thereby and open the switch, the two switches being connected in series with each other and in the circuit of said solenoid so as to control the operation of the dispatch mechanism, and means at each receiving station responsive to a particular setting of the trips of an approaching carrier for operating the receiving mechanism.

11. In a conveyor system of the type having an endless conveyor member arranged to define ascending and descending runs between several floors of a building, carriers secured to said member at spaced intervals and adapted to receive and carry a load from one station to another, dispatch mechanism at several of the stations adjacent to the ascending run, including a dispatch carriage horizontally movable into and out of load transfer position with respect to carriers traveling along the ascending run, and receiving mechanism at several of the stations adjacent to the descending run, including a receiving carriage horizontally movable into and out of load transfer position with respect to carriers traveling along the descending run, control mechanism for governing the operation of the dispatch and receiving mechanisms, comprising a plurality of trips mounted on each carrier so as to be individually set from an inoperative position to an operative position, a plurality of trip-setting levers corresponding to said trips and mounted at each dispatch station along the ascending run so as to swing outwardly from inactive position to engage the trips of a passing carrier, lever-setting means at each dispatch station including a rotatable drum having spaced openings, the surface of said drum being engageable with said levers to hold them in inactive position and said openings being arranged to receive parts of said levers to permit selected levers to swing from inactive position to active position wherein the selected levers set the corresponding trips on a passing carrier to operative position, control means at each receiving station comprising an electrical circuit including a solenoid operative when energized to actuate the receiving mechanism to move the receiving carriage to load transfer position, at least one normally open switch located in advance of the receiving station, said switch being connected in said circuit and having actuating means positioned so as to be engaged by a predetermined setting of at least one of the trips of a carrier approaching the station thereby to close the switch and effect the operation of the receiving mechanism, and means on the receiving carriage for resetting the trips corresponding to that station back to inoperative position.

12. In a conveyor system of the type having an endless conveyor member arranged to define ascending and descending runs between several floors of a building, carriers secured to said member at spaced intervals and adapted to receive and carry a load from one station to another, dispatch mechanism at several of the stations adjacent to the ascending run, including a dispatch carriage horizontally movable into and out of load transfer position with respect to carriers traveling along the ascending run, and receiving mechanism at several of the stations adjacent to the descending run, including a receiving carriage horiontally movable into and out of load transfer position with respect to carriers traveling along the descending run, control mechanism for governing the operation of the dispatch and receiving mechanisms comprising a plurality of trips mounted on each carrier so as to individually set from an inoperative position to an operative position, a plurality of trip-setting levers corresponding to said trips and mounted at each dispatch station along the ascending run so as to swing outwardly from inactive position to engage the trips of a passing carrier, lever-setting means at each dispatch station including a rotatable drum having spaced openings, the surface of said drum being engageable with said levers to hold them in inactive position and said openings being arranged to receive parts of said levers to permit selected levers to swing from inactive position to active position wherein the selected levers set the corresponding trips on a passing carrier to operative position, an electrical circuit including a solenoid and a circuit-holding relay, said solenoid being operative when energized to actuate the dispatch mechanism, a normally opened switch carried by the dispatch mechanism and arranged so as to be closed when a load is placed on the dispatch carriage, a normally closed switch having an actuating member projecting into the path of travel of an approaching carrier so as to engage a load carried thereby and open the switch, a normally opened switch located in advance of each dispatch station and arranged to be closed by a carrier approaching the station, the three switches being connected in series with each other and in the circuit of said solenoid so as to control the operation of said dispatch mechanism, a fourth switch connected with the circuit-holding relay and disposed on the departing side of said station, said fourth switch being normally closed and operated by a carrier leaving the dispatch station to cut out said relay so as to deenergize said solenoid, a second electrical circuit associated with each receiving station and including a solenoid and circuit-holding relay, said solenoid being operative when energized to actuate the receiving mechanism, at least one normally opened switch located in advance of said station, said switch being connected in said second circuit and having actuating means positioned so as to be engaged by a predetermined setting of at least one of the trips of a carrier approaching the station thereby to close the switch and effect energization of said solenoid to operate said receiving mechanism, and means on each receiving carriage for resetting said trips corresponding to that station back to inoperative position.

13. In a conveyor system of the type having an endless conveyor member arranged to define ascending and descending runs between several floors of a building, carriers secured to said member at spaced intervals and adapted to receive and carry a load from one station to another, dispatch mechanism at several of the stations adjacent to the ascending run, including a dispatch carriage horizontally movable into and out of load transfer position with respect to carriers traveling along the ascending run, and receiving mechanism at several of the stations adjacent to the descending run, including a receiving carriage horizontally movable into and out of load transfer position with repsect to carriers traveling along the descending run, control mechanism for governing the operation of the dispatch and receiving mechanisms comprising a plurality of trips mounted on each carrier so as to individually swing from an inoperative position to an operative position, a plurality of trip-setting levers corresponding to said trips and mounted at each dispatch station along the ascending run so as to swing outwardly from inactive position to engage the trips of a passing carrier, lever-setting means at each dispatch station including a rotatable drum having spaced openings, the surface of said drum being engageable with said levers to hold them in inactive position and said openings being arranged to receive parts of said levers to permit selected levers to swing from inactive position to active position wherein the selected levers set the corresponding trips on a passing carrier to operative position, an electrical circuit including a solenoid and a circuit-holding relay, said solenoid being operative when energized to actuate the dispatch mechanism, a normally opened switch carried by the dispatch mechanism and arranged so as to be closed when a load is placed on the dispatch carriage, a normally closed switch having an actuating member projecting into the path of travel of an approaching carrier so as to engage a load carried thereby and open the switch, a normally opened switch located in advance of each dispatch station and arranged to be closed by a carrier approaching the station, the three switches being connected in series with each other and in the circuit of said solenoid so as to control the operation of said dispatch mechanism, a fourth switch connected with the circuit-holding relay and disposed on the departing side of said station, said fourth switch being normally closed and operated by a carrier leaving the dispatch station to cut out said relay so as to deenergize said solenoid, a second electrical circuit associated with each receiving station and including a solenoid and circuit-holding relay, said solenoid being operative when energized to actuate the receiving mechanism, at least one normally open switch located in advance of said station, said switch being connected in series in said second circuit and having actuating means positioned so as to be engaged by a predetermined setting of at least one of the trips of a carrier approaching the station thereby to close the switch and effect energization of said solenoid to operate said receiving mechanism, a normally closed switch at each receiving station arranged so as to be opened by a load transferred from a passing carrier to the receiving carriage, said switch being connected in said second circuit so as to prevent the energization of said solenoid when a load transferred to said receiving carriage has not been removed, and means at each receiving station responsive to the operation of said receiving carriage for resetting the said trips corresponding to that station back to inoperative position.

14. In a conveyor of the type having a plurality of dispatch and receiving stations and carriers moving along a fixed path between said stations, each carrier having a plurality of movable trips arranged so as to be individually set in accordance with the intended destination of a load carried thereby, trip-setting mechanism at each dispatch station comprising a plurality of trip-setting members arranged along the path of travel of the carrier and individually adjustable from an inoperative position, wherein their free ends are spaced from the trips of a passing carrier, to an operative position, wherein said free ends engage and set the trips of a passing carrier, a rotatable member having parts engageable with said trip-setting members to hold them in one position and a plurality of spaced openings arranged to receive parts of said trip-setting members to permit them to be moved to another position so that upon a predetermined degree of rotation of said rotatable member any one or combination of trip-setting members may be set to operate the corresponding trips of a passing carrier, and means engageable with said trip-setting members for restoring and normally maintaining them in inoperative position.

15. In a conveyor of the type having a plurality of dispatch and receiving stations and carriers moving along a fixed path between said stations, each carrier having a plurality of movable trips arranged so as to be individually set in accordance with the intended destination of a load carried thereby, trip-setting mechanism at each dispatch station comprising a rock shaft, a plurality of levers mounted on said rock shaft along the path of travel of said carriers, each lever having a frictional gripping action on said rock shaft so as to rock therewith, unless restrained, from an inoperative position, wherein its free end is spaced from the corresponding trip on each carrier, to an operative position, wherein its free end engages and sets the corresponding trip of a passing carrier, a rotatable drum having spaced openings, the surface of said drum being engageable with each of said levers so as to restrain rocking movement and thereby prevent setting of the levers, said openings being arranged to receive parts of said levers to permit them to move to operative position so that upon a predetermined degree of rotation of said rotatable member any one or combination of levers may be set to operate the corresponding trips of a passing carrier, means responsive to the approach of a carrier to rock said shaft to set selected levers in operative position, and means responsive to the departure of the carrier to reset and normally maintain said levers in inoperative position.

16. In a conveyor of the type having a plurality of dispatch and receiving stations and carriers moving along a fixed path between said stations, each carrier having a plurality of movable trips arranged so as to be individually set in accordance with the intended destination of a load carried thereby, trip-setting mechanism at each dispatch station comprising a plurality of trip-setting members arranged along the path of travel of the carrier and individually adjustable from an inoperative position, wherein their free ends are spaced from the trips of a passing carrier, to an operative position, wherein said free ends engage and set the trips of a passing carrier, a solenoid operative upon being energized to move said trip-setting members from inoperative to operative position, means operative upon the de-energization of said solenoid to reset and normally maintain said trip-setting members in inoperative position, and a rotatable drum having spaced openings, the surface of said drum being engageable with each of said trip-setting members to lock it in inoperative position, said openings being arranged to receive parts of said levers to permit them to move to operative position so that upon a predetermined degree of rotation of said rotatable member any one or combination of trip-setting members may be set to operate the trips of a passing carrier.

17. In a conveyor of the type having a plurality of dispatch and receiving stations and carriers moving along a fixed path between said stations, each carrier having a plurality of movable trips arranged so as to be individually set in accordance with the intended destination of a load carried thereby, trip-setting mechanism at each dispatch station comprising a rock shaft, a plurality of levers mounted on said rock shaft along the path of travel of said carriers, each lever having a frictional gripping action on said rock shaft so as to rock therewith, unless restrained, from an inoperative position, wherein its free end is spaced from the corresponding trip on each carrier, to an operative position, wherein its free end engages and sets the corresponding trip of a passing carrier, a rotatable drum having spaced openings engageable with each of said levers so as to restrain rocking movement and thereby prevent setting of the levers, said openings being arranged to receive parts of said levers to permit them to move to operative position so that upon a predetermined degree of rotation of said rotatable member any one or combination of levers may be set to operate the corresponding trips of a passing carrier, a solenoid connected with said shaft and operative upon being energized to rock said shaft to set selected levers, a normally open switch controlling the energization of said solenoid, said switch having an actuating member engageable by an approaching carrier to close said switch, and means responsive to de-energization of said solenoid to reset and normally maintain said levers in inoperative position.

18. In a conveyor of the type having a plurality of dispatch and receiving stations and carriers moving along a fixed path between said stations, each carrier having a plurality of movable trips arranged so as to be individually set in accordance with the intended destination of a load carried thereby, trip-setting mechanism at each dispatch station comprising a rock shaft, a plurality of levers mounted on said rock shaft along the path of travel of said carriers, each lever having a frictional gripping action on said rock shaft so as to rock therewith, unless restrained, from an inoperative position, wherein its free end is spaced from the corresponding trip on each carrier, to an operative position, wherein its free end engages and sets the corresponding trip of a passing carrier, a rotatable drum juxtaposed to said levers, said drum having spaced openings, the surface of said drum being engageable with said levers to hold them in inoperative position and said openings being arranged to receive parts of said levers to permit them to swing to operative position so that upon a predetermined degree of rotation of said drum any one or combination of levers may be set to operate the corresponding trips of a passing carrier, resilient means acting on said shaft and yielding restraining rocking movement thereof, thereby normally to maintain the levers in inoperative position, and means operative as a carrier approaches and passes the dispatch station to rock said shaft and thereby set selected levers in operative position.

19. In a conveyor of the type having a plurality of dispatch and receiving stations and carriers moving along a fixed path between said stations, each carrier having a plurality of movable trips arranged so as to be individually set in accordance with the intended destination of a load carried thereby, trip-setting mechanism at each dispatch station comprising a rock shaft, a plurality of levers mounted on said rock shaft along the path of travel of said carriers, each lever having a frictional gripping action on said rock shaft so as to rock therewith, unless restrained, from an inoperative position, wherein its free end is spaced from the corresponding trip on each carrier, to an operative position, wherein its free end engages and sets the corresponding trip of a passing carrier, a rotatable drum juxtaposed to said levers, said drum having spaced openings, the surface of said drum being engageable with said levers to hold them in inoperative position and said openings being arranged to receive parts of said levers to permit them to swing to operative position so that upon a predetermined degree of rotation of said drum any one or combination of levers may be set to operate the corresponding trips of a passing carrier, resilient means acting on said shaft and yielding restraining rocking movement thereof, thereby normally to maintain the levers in inoperative position, a solenoid operative when energized to rock said shaft, and a control circuit for said solenoid, said circuit including a normally open switch having an actuating member arranged to engage an approaching carrier so as to close said switch and effect energization of said solenoid, and a normally closed switch having an actuating member arranged to engage the departing carrier so as to open the normally closed switch and thereby effect deenergization of said solenoid.

S. L. GRISWOLD KNOX.

REFERENCES CITED

The following references are of record in the file of this patent:

UNITED STATES PATENTS

| Number | Name | Date |
| --- | --- | --- |
| 1,832,000 | Caesar | Nov. 17, 1931 |
| 1,900,603 | Gotthardt | Mar. 7, 1933 |
| 2,216,685 | Caesar | Oct. 1, 1940 |